US008858138B2

(12) United States Patent
Hearn et al.

(10) Patent No.: US 8,858,138 B2
(45) Date of Patent: Oct. 14, 2014

(54) ANCHORAGE SYSTEMS AND DEVICES

(75) Inventors: Gary Alexander Hearn, Yeovil (GB);
Stephen Johnston-Hyde, Beaminster (GB)

(73) Assignee: C.N. Unwin Limited, Somerset (GB)

( * ) Notice: Subject to any disclaimer, the term of this patent is extended or adjusted under 35 U.S.C. 154(b) by 540 days.

(21) Appl. No.: 13/010,125

(22) Filed: Jan. 20, 2011

(65) Prior Publication Data

US 2011/0219605 A1  Sep. 15, 2011

(30) Foreign Application Priority Data

Jan. 20, 2010 (GB) .................................. 1000908.2

(51) Int. Cl.
*B60P 7/08* (2006.01)
*B60N 2/015* (2006.01)
*B64D 11/06* (2006.01)

(52) U.S. Cl.
CPC ........ *B60N 2/01508* (2013.01); *B60N 2/01575* (2013.01); *B64D 11/0696* (2013.01); *B60N 2/01516* (2013.01)
USPC .......................................... 410/105; 410/104

(58) Field of Classification Search
USPC ............... 410/104, 105, 106, 116; 244/118.1, 244/118.6; 248/503.1
See application file for complete search history.

(56) References Cited

U.S. PATENT DOCUMENTS

| 4,026,218 | A | 5/1977 | Prete, Jr. et al. |
| 4,062,298 | A | 12/1977 | Weik |
| 4,449,875 | A | 5/1984 | Brunelle |
| 5,489,172 | A | 2/1996 | Michler |
| 6,299,230 | B1 | 10/2001 | Oettl |
| 6,902,365 | B1 | 6/2005 | Dowty |
| 7,641,426 | B2 * | 1/2010 | Stubbe .......................... 410/105 |
| 2007/0065248 | A1 | 3/2007 | Legeay |

FOREIGN PATENT DOCUMENTS

| DE | 29712180 U1 | 9/1997 |
| DE | 29902465 U1 | 6/1999 |
| DE | 202005013714 U1 | 12/2005 |
| EP | 0581072 A1 | 2/1994 |
| EP | 1892142 A1 | 2/2008 |
| EP | 2206623 A1 | 7/2010 |

(Continued)

OTHER PUBLICATIONS

United Kingdom Search Report, Dated May 10, 2011, in Application No. GB 1000908.2.

(Continued)

*Primary Examiner* — Stephen Gordon
(74) *Attorney, Agent, or Firm* — Young & Thompson

(57) ABSTRACT

A releasable anchorage device for securing seats to tracks in vehicle floors has an elongate body with a fixed, non-slidable downward protrusion at its front end, an actuating lever at its rear end, and sets of slidable securing feet movable relative to the protrusion by the lever operating via an actuating mechanism. The mechanism includes an elongate drive rod connecting the lever to a middle set or front set of the feet which have an anti-rattle mechanism to grip the track, such as by longitudinally-inclined upper surfaces thereon. A rear set of feet may also be slidable and can move together with the middle feet. The lever is easily accessible, being at the rear end, but operates to provide an anti-rattle engagement with the track at an intermediate point along the device, spaced from the rear end, where the prevention of rattling is particularly needed.

23 Claims, 9 Drawing Sheets

(56) References Cited

FOREIGN PATENT DOCUMENTS

| | | |
|---|---|---|
| FR | 2912993 A1 | 8/2008 |
| GB | 2219493 A | 12/1989 |
| GB | 2315013 A | 1/1998 |
| GB | 2406877 B1 | 4/2005 |
| WO | 2008113610 A2 | 9/2008 |
| WO | 2010107343 A1 | 9/2010 |
| WO | 2011005600 A1 | 1/2011 |

OTHER PUBLICATIONS

European Search Report, dated May 9, 2011, in Application No. EP 11250061.

European Search Report, dated May 9, 2011, in Application No. EP 11250062.

United Kingdom Search Report, dated Nov. 25, 2010, in GB1000907.4.

* cited by examiner

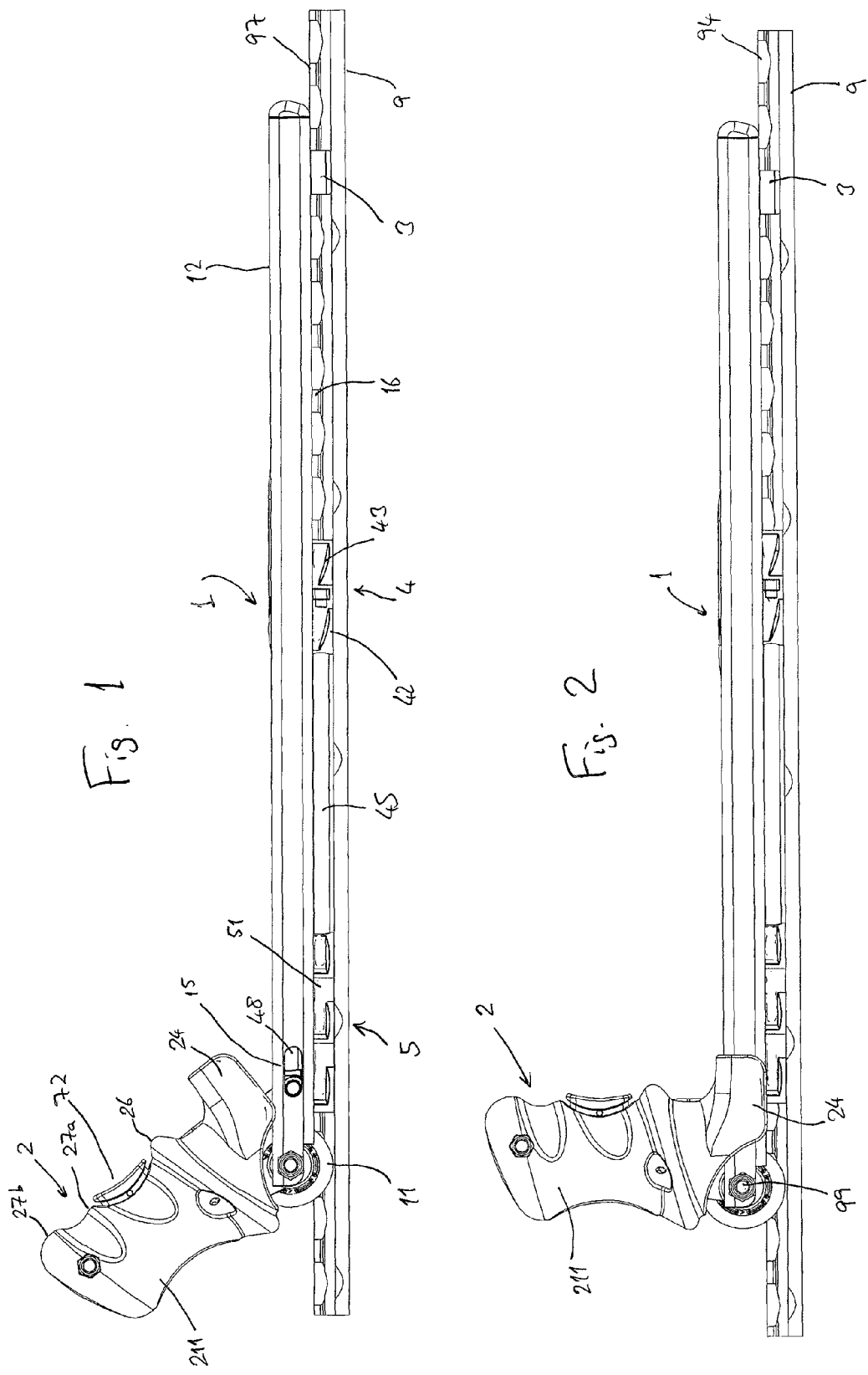

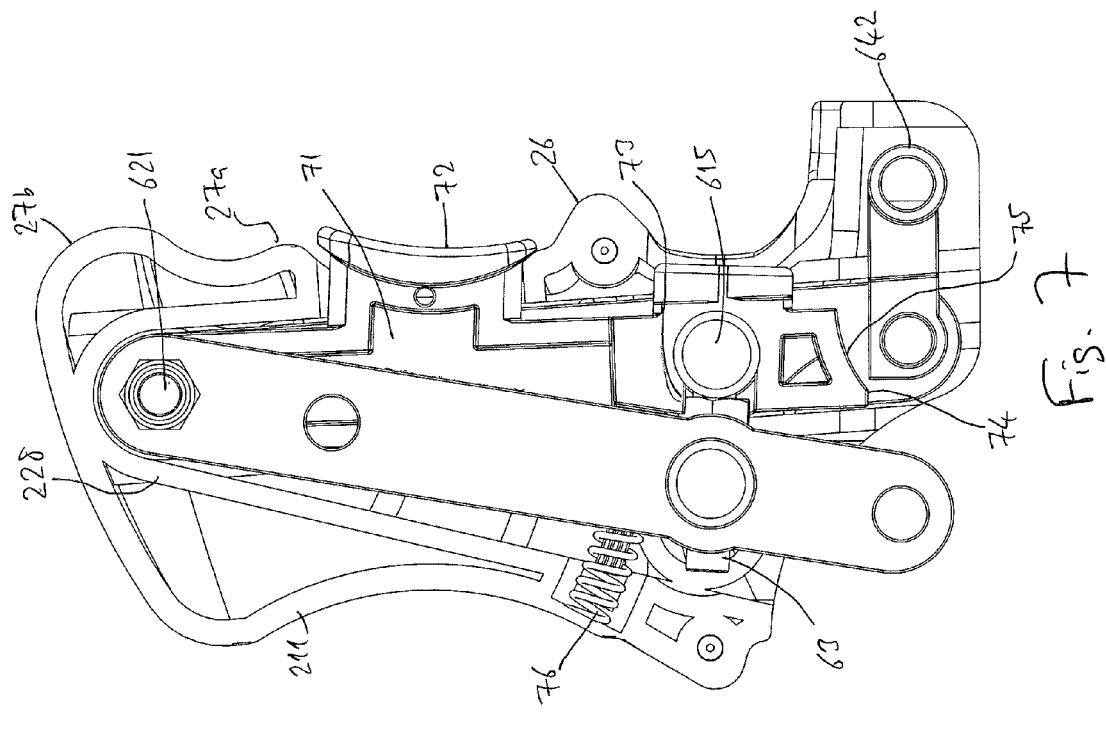

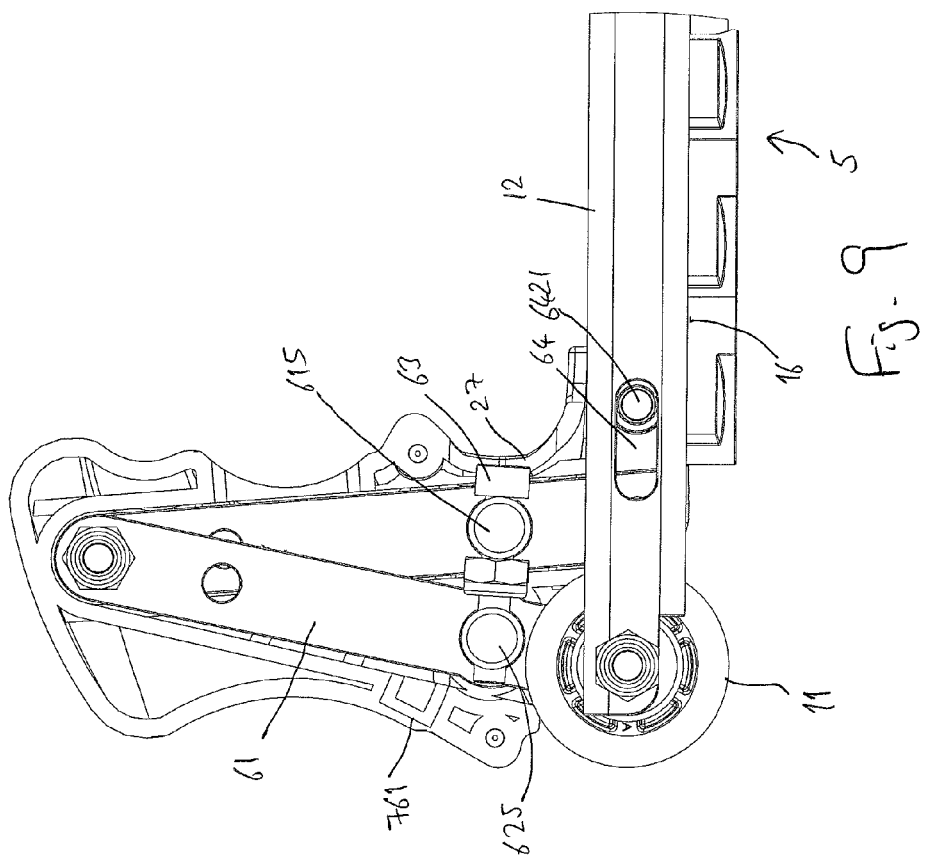
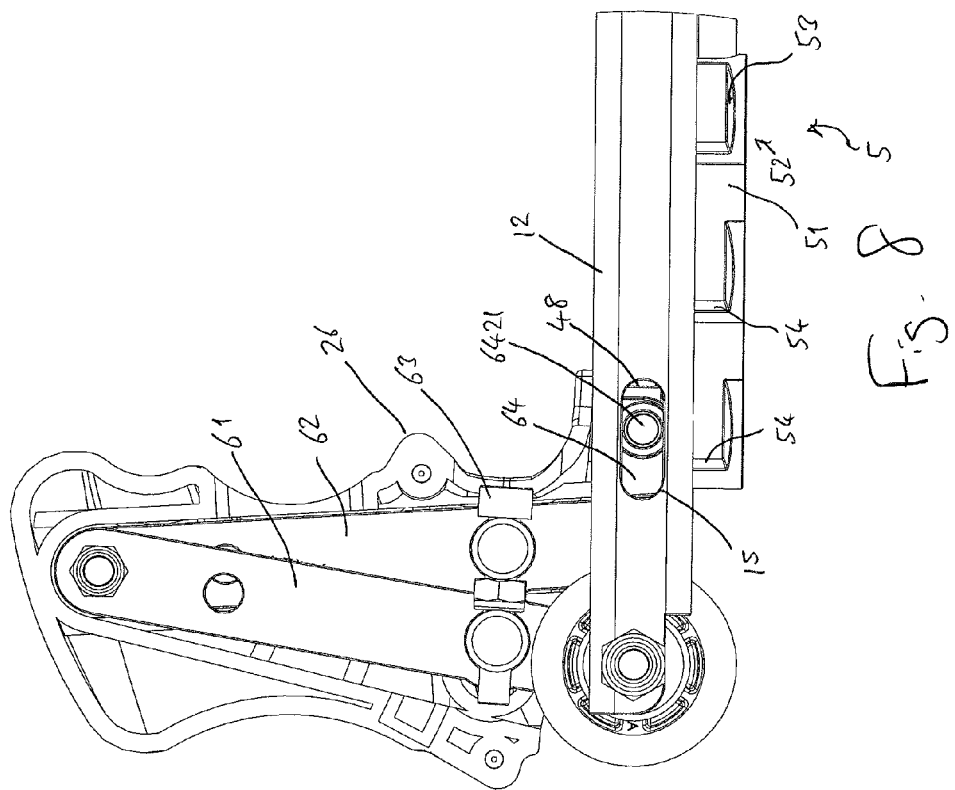

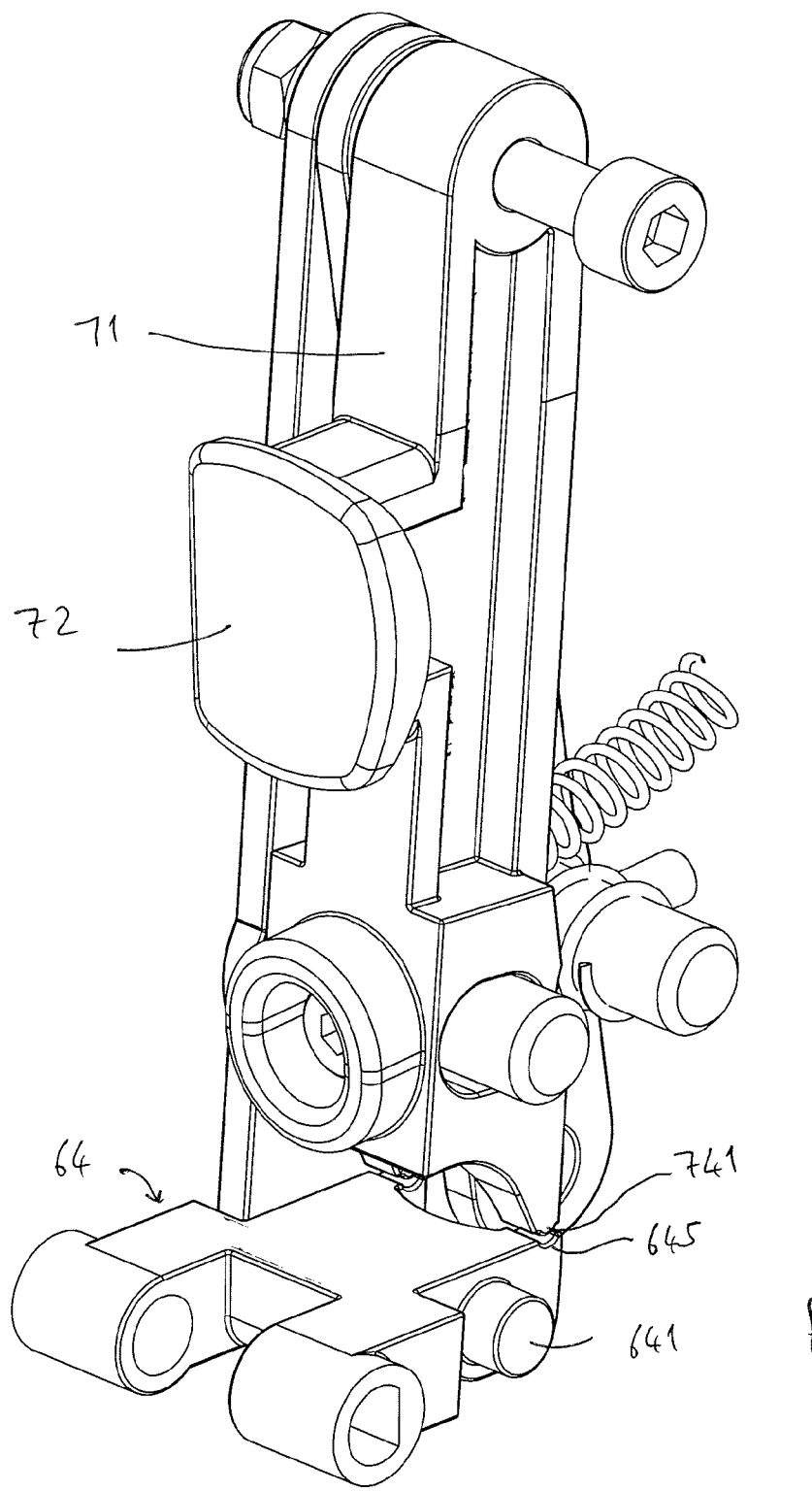

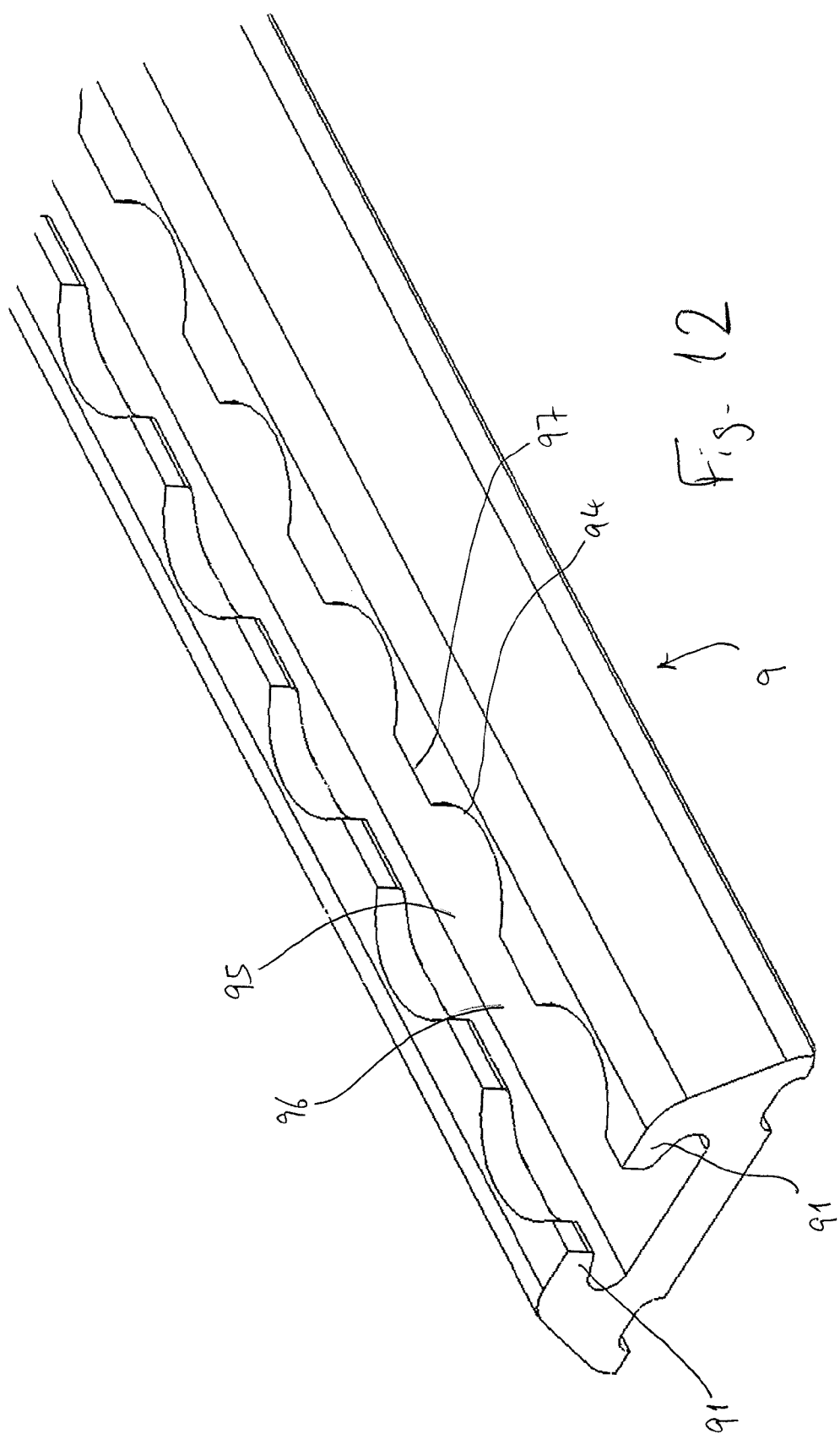

ANCHORAGE SYSTEMS AND DEVICES

FIELD OF THE INVENTION

This invention has to do with devices, systems and arrangements and methods for anchoring articles by means of track or rail formations. It has particular use for anchoring seats and the like in vehicles.

BACKGROUND

It is well known to adapt the floors of vehicles (such as vans, minibuses and coaches) for the releasable and adjustable securing of seats, wheelchairs or other objects or furniture at any of a range of locations with variable position according to need. Typically this is by means of one or more tracks fixed onto or integrated into the vehicle floor. The tracks have an upwardly-open internal channel, usually of extruded aluminium, and the top slot opening of the channel—extending the length of the track—is defined between opposed overhanging flanges or lips.

Articles such as seats are secured to these tracks via releasable anchorage devices—either discrete devices, or incorporated as part of the article to be secured—having inverted-T section (e.g. mushroom-shaped) anchorage formations adapted to be retained by engagement beneath the track flanges. [In what follows, descriptions are presented as for a horizontal, upwardly-open track with the anchorage device above, this being the usual situation, but of course this is not intended to limit the technical meaning unless the context clearly requires it. The tracks and anchorages may be used on walls and ceilings.]

Various kinds of track are in use. The simplest format with a uniform width, parallel-sided top slot requires outwardly-expandable anchorage formations if they are to be insertable from above. Clamping of the anchorage against the track is needed to prevent longitudinal movement.

Another popular track format has the flanges interrupted by a series of uniformly-spaced cut-outs so that the top slot has a series of periodic enlargements, usually of circular outline (so as to be formable by drilling). See FIG. 12. Each flange 91 has a regular series of arcuate cut-outs 94. Opposed cut-out pairs provide enlargements 95 of the track slot at a pitch "x". Intervening parallel straight flange edge parts 97 define restrictions 96 thereof.

Anchorage devices usable with such track have retaining formations with longitudinally-localised laterally-enlarged bottom parts (feet) and narrower intermediate-height parts (stem), so that they are insertable into the track when the feet are aligned with cut-outs (removal/insertion position) but when slid along through about half a pitch spacing the feet are captive beneath the flanges. One or more such slidable feet then anchor the device against being pulled up away from the track.

It is necessary to hold or lock the device longitudinally in position relative to the track so that the slidable foot cannot slide from the captive position to a removal/insertion position. Usually one or more non-slidable formations are provided, dimensioned to project down into a cut-out but unable to slide through the narrow parts. Such non-slidable protrusions serve to transfer operational longitudinal loads from the anchorage device to the track as well as holding the slidable portion(s) in the captive position.

To be able to engage/disengage both slidable feet and non-slidable protrusions with a track, the anchorage device must provide for relative movement between them. One conventional way is by forming a non-slidable protrusion as a "plunger", positioned about half a pitch step out relative to the slidable foot portion(s) and movable up and down in the device so that it can be lowered into a track cut-out after the slidable foot portion has been inserted and slid to the captive position. Alternatively it is known to provide a mechanism in the device to shift slidable and non-slidable formations longitudinally relative to one another in the device, changing their spacing from some multiple of the pitch spacing (insertable/removable) to being substantially half a pitch out (captive).

One particular use of current importance for such rail systems is in the securing of seats in vehicles e.g. vehicles designed or adapted for use by elderly and/or disabled people.

Usually two sides of a seat may be rigidly secured down via respective anchorage devices engaging a pair of tracks at either side of the seat. Or, such anchorage devices may be incorporated into a seat base or leg structure.

Anchorage devices for seating have certain criteria. Firstly it is important that at the rear end—that is, the end towards the rear of the vehicle irrespective of the orientation of the seat—the anchorage is strongly resistant to being pulled up out of the track, because that is a primary load in the event of a front-on crash. At the front end, much less pull-up resistance is needed. Adequate longitudinal load resistance must be provided in any event, by distributing the engagement of the device with the track among plural points.

Secondly it is important to avoid "rattle". The feet fit with clearance in the track channel, so that the devices are easy to insert and slide, and so that distortion and some variations in track dimensions can be accommodated. However play, shifting and rattling are highly undesirable in a seat fitting. Accordingly many known anchorage devices incorporate anti-rattle mechanisms whereby retaining formations in the track channel (such as feet) clamp or grip against the track in the captive position. See GB2219493, GB2315013, EP1892142 and WO2008/113610. Typically a formation of the device is lifted relative to a main body of the device to press or clamp the track flanges vertically, or expanded or shifted laterally to grip or clamp sideways in the channel or top slot. Or, as described in our co-pending application also entitled "Anchorage Systems and Devices", claiming the priority of GB1000907.4 (20 Jan. 2010) and which is incorporated herein by reference in its entirety, retaining feet may have longitudinally-inclined top surfaces or ramp surfaces which engage or clamp the track flange on simple longitudinal movement and can reduce or eliminate rattle without a lifting mechanism being necessary.

Thirdly it is preferred that a single anchorage device suffices for one side of a seat, so the device body may be quite long. This makes rattling more difficult to inhibit and a track-engaging formation adapted for anti-rattle is preferably provided at some intermediate position along the body of the device, as in the prior art cited above.

Fourthly, however, access to the device is awkward for seat installation. Seats are low at the seat part and overhang at the back, which hinders access to operating members e.g. levers or handles for longitudinal shifting of track-engaging formations or for actuating anti-rattle mechanisms. This ergonomic factor significantly limits the kinds of mechanisms used.

THE INVENTION

Our proposals relate in general to track anchorage devices of the kind having an elongate body or chassis with a front end and a rear end and plural track-engaging formations along its underside, one or more of the formations being movable relative to other formations and/or relative to the body to enable a securing operation whereby the device can be locked onto a track in use, preferably with an anti-rattle feature, and preferably in conjunction with seating.

Particular aims addressed herein in the context of such devices include the provision of new actuation mechanisms for actuating track-engaging formations for longitudinal shifting and/or anti-rattle, and new dispositions of track-engaging formations.

In a first aspect of our proposals an actuating member at or adjacent one end of the body, designated the rear end, is connected through an actuating mechanism to a proximal end of an elongate longitudinally-extending drive element which extends along the body. A distal part or distal end of the drive element is connected to a remote movable track-engaging formation, or to an anti-rattle mechanism for a track-engaging formation, at a position longitudinally spaced or remote from the proximal end of the drive element, e.g. is at an intermediate part of the body, or at or adjacent the other end thereof. Movement of the actuating member—preferably a lever, preferably moving in an upright plane, preferably moving in a longitudinal plane—displaces the drive element longitudinally and moves or operates the remote formation and/or mechanism.

Preferably the mechanism is such that forward movement of the actuating member moves the drive element forward. The drive element is preferably rigid and may operate/actuate the remote formation and/or mechanism by pushing. It may comprise a rod. A release movement of the actuating member may undo the operation. The drive element, remote formation or anti-rattle mechanism may be biased e.g. spring-biased to the undone state.

The actuating mechanism may include a catch or lock mechanism which operates, e.g. automatically in the actuation stroke, to hold it in the actuated position until a release actuator is operated.

The actuating mechanism may include a guided drive link connecting between the above-mentioned longitudinally-movable drive element and an actuator drive portion—on or moved by the actuating member—which moves with a non-longitudinal component e.g. in an arc, especially if the actuating member is a lever. The drive link has a rear end and a front end connected flexibly—preferably by pivot joint—to the actuator drive portion and drive element respectively. The drive link front end (or an adjacent portion of the drive element) engages a guide track of the device body such as a slot in a wall thereof to keep the drive element longitudinally aligned as the drive link moves off the longitudinal axis.

Preferably the drive link is rigid and connected by pivots at both front and rear. At the end of the forward actuating movement the drive link rear end may cross the longitudinal axis to an over-centre condition, so that the actuation is not reversible by reverse force along the drive element but requires initial manual reverse movement of the actuating member, e.g. rearward movement of an actuating lever (although spring bias may then complete the reverse movement). A release actuator may also need to be operated to unlock this movement as mentioned. In its locked condition the release mechanism may engage the drive link to keep it in the over-centre position. It may have a release mechanism operating member which is biased, e.g. spring-biased, to move automatically into that engagement with the drive link as the actuating mechanism completes its actuating stroke.

The actuating member may be a lever pivoted to the device body, e.g. behind the actuator drive portion that connects to the pivoted drive link, when that is used. Preferably the lever is in a backward position for the released or undone state, and in a relatively forward e.g. upright position for the actuated state. With a drive link, swinging the lever back lifts the rear end of the drive link back in an arc. Pushing the lever forward drives the drive element forward compressively via the drive link and its pivots.

The actuating mechanism may have an adjustment mechanism for changing a predetermined stroke or degree of advancement of the drive element. This is useful when it actuates an anti-rattle or track-engaging mechanism whose optimum stroke may depend on the dimensions of the track with which it is used.

Usually the actuating member has some stop portion to engage the device body and define the actuated position. A simple stroke adjustment is provided by adjusting the position of this stop portion. However this changes the end position and may interfere with the lock/release function. It is preferable that a drive portion of the actuator member that connects to the mechanism, e.g. the above-mentioned actuator portion that connects to a drive link, is positionally adjustable relative to the actuator member e.g. by an adjustment screw.

In a most preferred mechanism the actuator lever includes front and rear legs pivoted together at one end (preferably at the top, the free end of the lever being at the top), the other end of the rear leg being pivoted to the device body at the lever pivot and the other end of the front leg being pivoted to the rear end of the drive link. The angle between the front and rear legs is adjustable, e.g. by an adjustment screw. This adjusts the longitudinal position of the fully-actuated drive link without interfering with the over-centre operation of the mechanism.

The lever may have a casing in which said actuating mechanism is enclosed.

Additionally or alternatively a release mechanism may be enclosed in the lever casing. An operating member for the lever release, such as a button which releases the mechanism when pressed, may be on the lever exterior. The release operating member may be recessed relative to the surrounding lever exterior, to prevent accidental release of the mechanism by casual impacts.

Another aspect of the present proposals, combinable freely with any features described above, relates to the dispositions and types of track-engaging formations provided along the body of the device.

One proposal is an anchorage of the kind described having one or more non-slidable protrusions adjacent the front end, plural slidable protrusions adjacent the rear end, and track-engaging formations with an anti-rattle feature (of any of the kinds referred to previously) at an intermediate position. Desirably an actuating member for the anti-rattle feature is at the rear end, e.g. in line with the actuating mechanism proposals described above. The anti-rattle feature is preferably based on a cam action driven by longitudinal movement. The longitudinal movement may drive cam action between mechanism components in the device body, to move (e.g. lift) one or more slidable feet beneath the track flanges (such mechanisms are known per se). Or, one or plural slidable feet at the intermediate position may have an inclined or ramped upper surface as described in our above-mentioned co-pending patent application of the same date, so that anti-rattle engagement is available at the intermediate position simply by longitudinal movement of these feet.

Desirably the slidable protrusions adjacent the rear end do not have an anti-rattle feature, although they may have one. Their main function is resisting pull-out. They may additionally feature one or more longitudinally-directed fixed abutment shoulders lying within the plan shape of the feet at the intermediate height, as described in our EP-A-2206623, the disclosure of which regarding the shoulder feature is hereby incorporated by reference. These render the feet semi-slidable (i.e. they can slide in only one direction) but enhance the distribution of longitudinal loads and hence improve maximum strength.

Preferably the sets of protrusions adjacent the rear end and at the intermediate portion are all slidable or semi-slidable, and connected through a longitudinal drive element (such as a drive element of the first aspect described above) so as to move longitudinally together even though they may be spaced apart. When the device is fitted to track it can be located by the one or more non-slidable protrusions at the front end. With an actuating member in the de-actuated position the slidable feet of the rear and middle sets drop into the track. Moving the member to the actuating position moves the rear and middle sets—preferably forwardly—into the captive position and preferably simultaneously engages an anti-rattle mechanism, preferably at the middle set as mentioned above.

Initial engagement of a fixed non-slidable protrusion is usually preferred because the device body then stays exactly in position when longitudinally-moving track-engaging formations are actuated. However this is not always essential and in principle it is possible to provide one or more non-slidable protrusions mounted longitudinally movably on the body and slidable protrusions fixed on the body.

The device may have a support wheel at the rear end. This may share an axis or axle with an actuating lever.

The device body may have one or more top connector formations, such as bolts, threaded bores, eyes, brackets and the like, for attaching an article such as a seat to be secured to the track by the anchorage device. These may be conventional. Alternatively the anchorage device may be incorporated into the leg structure of a furnishing article such as a seat.

The body of the device preferably has a hollow metal casing or housing with a longitudinal opening on the underside for projecting track-engaging formations. Carriage or slider components carrying slidable or semi-slidable track-engageable feet may be slidable along inside the casing. Side walls of the casing may provide guide slots for a drive link, in the drive link aspect discussed above.

A biasing spring to bias longitudinal movement of slidable or semi-slidable feet may be mounted longitudinally inside the body casing.

Aspects of the invention include anchorage devices of the kind described, anchorage systems including an anchorage device and one or more corresponding tracks, a vehicle comprising such a system, and articles comprising such anchorage devices whether integrally or as an attachment. Preferred embodiments include seats, seat anchorages and restraint straps. Further aspects include methods of securing or restraining objects in vehicles, especially to vehicle floors, especially seating, using anchorage systems and anchorage devices as described. One or more of the anchorage devices may be secured to the track and then to an object to be restrained, or vice versa, or the object to be restrained such as a seat may integrally comprise one or more of the anchorage devices which is/are secured to the track.

BRIEF DESCRIPTION OF THE DRAWINGS

Embodiments of the invention are now described by way of example, with reference to the accompanying drawings in which:

FIG. 1 is a side view of an anchorage device embodying the invention positioned on a track in the released condition, the track being shown in vertical median section;

FIG. 2 is a similar view with the device actuated to lock it in place;

FIGS. 6 and 7 are views from the right into the open right side of the actuation lever in the actuated (forward) position, showing respectively the locked and released conditions of the mechanism;

FIGS. 8 and 9 are views from the right into the exposed left side of the actuation lever in the actuated (forward) position with the right-side legs and release mechanism removed, and show respectively full retraction and full advance of the anti-rattle adjustment mechanism;

FIG. 11 shows a refinement of the release mechanism, in a view similar to that of FIG. 5, and FIG. 12, already described, shows a section of track.

DETAILED DESCRIPTION OF EMBODIMENTS, INCLUDING BEST MODE

Figure 3:
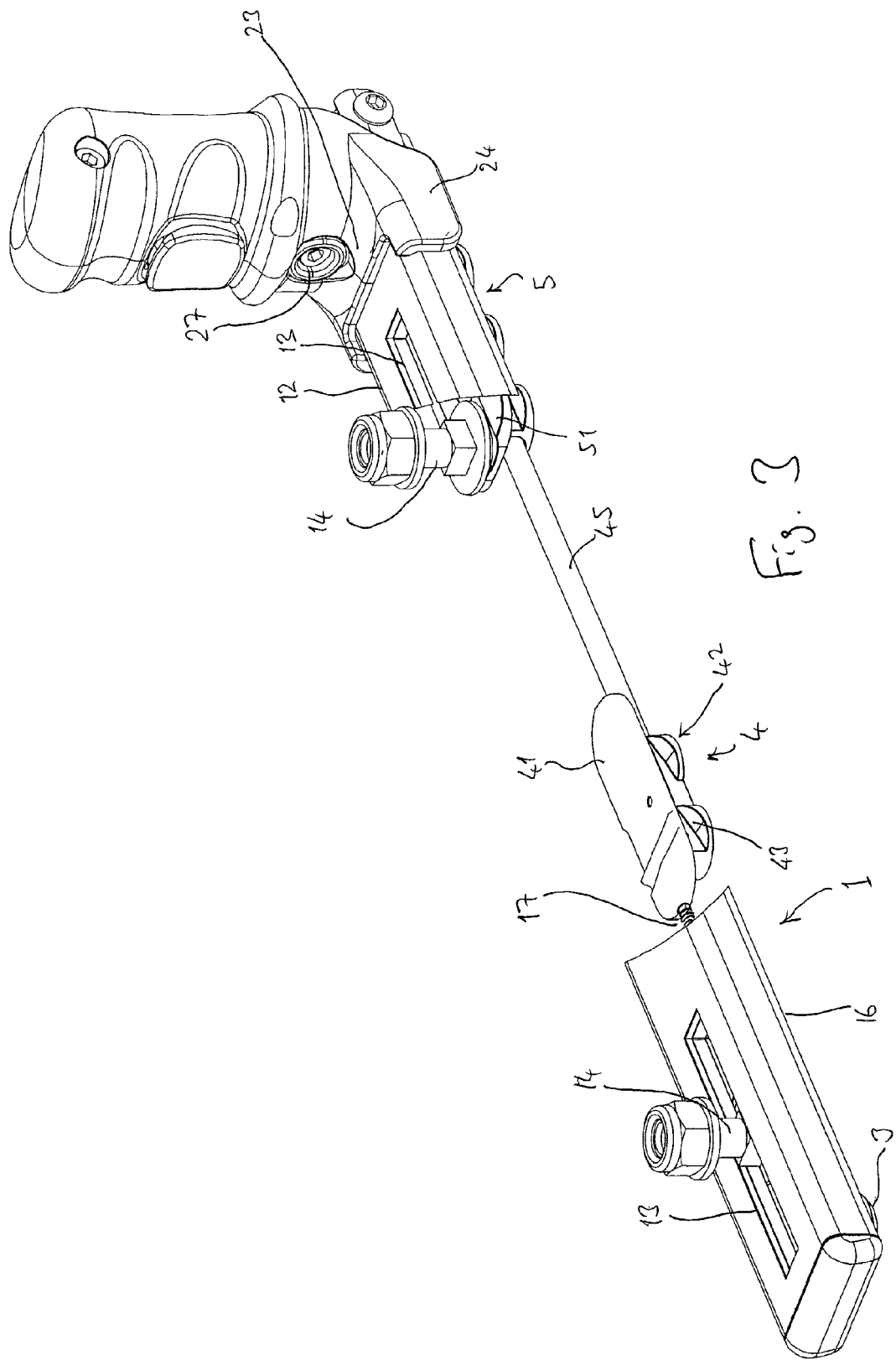
FIG. 3 is an isometric view of the device with part of the body casing broken away.
Figure 4:
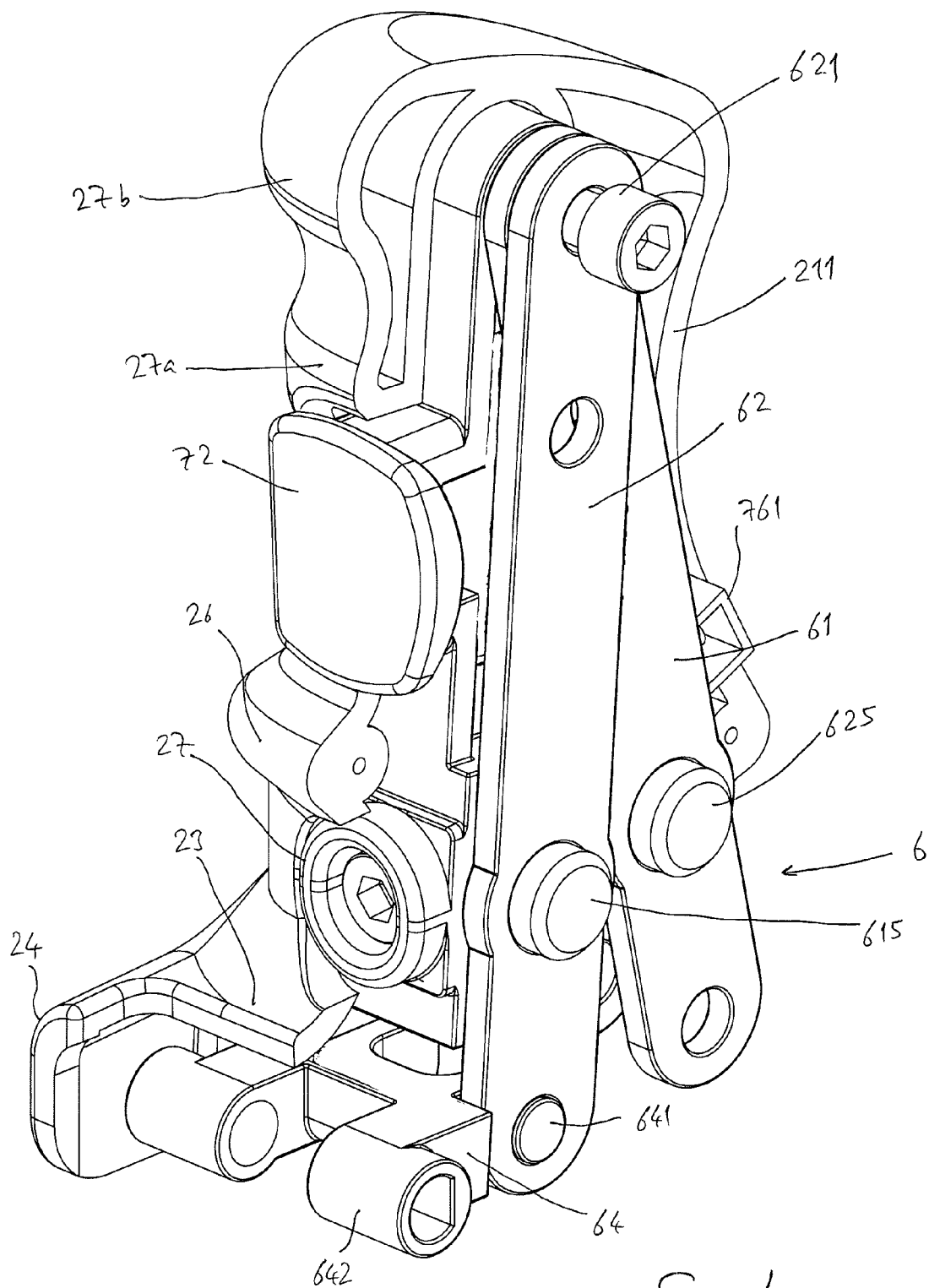
FIG. 4 is an isometric view of the actuation lever from the left front, with half of the casing broken away.

With reference to FIGS. 1 to 3, an anchorage device suitable for anchoring seats to a track 9 has an elongate body 1 consisting generally of a rectangular sheet-metal casing 12 formed around a metal support frame in the top of which conventional fixing bolts 14 for securement to a seat unit are mounted in longitudinal slots 13 for positional adjustment. This is known. The slots 13 are defined in metal frame inserts housed in the casing 12.

At the front end of the body (the right-hand end in FIGS. 1 and 2), which in use will be towards the front of the vehicle in which a seat is mounted, a single fixed cylindrical downward protrusion 3 is provided. This fits closely in a cut-out region 94 (enlargement) of the track 9 and is not slidable along the track at all.

The rear two-thirds of the body length houses a middle set 4 of slidable feet and a rear set 5 of slidable feet. Each of these sets is provided on a respective solid slider body 41, 51 housed slidably within the casing 12, carrying the respective track-engaging formation beneath. The track-engaging formation has a central narrow keel or stem part narrow enough to move along the narrow parts of the track slot, and laterally-projecting feet portions 42, 52 of generally circular outline so that they can be inserted through the track enlargements 95. The middle and rear sliders 41, 51 are fixed rigidly to front and rear portions of a connector or drive rod 45 so that they move longitudinally together. Rod 45 runs underneath the lower surface 16 of the casing 12 as seen in FIG. 1 and is narrow enough to lie in the track slot. The top of the rear slider 51 carries a rear drive rod connector portion 48 with a horizontal transverse pivot connector bore (not visible in the drawing) which connects to a drive link 64 described later.

The middle feet 42 have top surfaces 43 which are inclined from the horizontal in the longitudinal direction over substantially all their length. This is the invention described in our application of even date mentioned above. The angle of inclination is preferably between 5° and 20°, more preferably between 10° and 20°. It may vary longitudinally, or be approximately constant. Preferably the angled surface extends at least half the longitudinal length of the foot. Desirably the spacing between the foot top surface 43 and the body undersurface 16 at the front, low end of the foot surface is at least 1.5 times and more preferably at least twice the corresponding clearance at the rear, high end. This upwardly-ramped foot surface 43, converging with the undersurface 16 of the anchorage body, constitutes an anti-rattle feature which is operable by simple longitudinal shift. That is, the feet 42 drop down into track enlargements 95 in the usual way: FIG. 1. They are then slid forward through substantially half a pitch space to the position shown in FIG. 2, bringing their ramped surfaces 43 into sliding compressive engagement with the undersides of the track flanges. This takes up vertical play of the carriage slider 41 in the body and draws the body casing down into a non-rattling condition tight against the track.

All four of the middle feet 42 have the same surface conformation. The exact number of feet with this conformation is not critical, but it is preferable that all the feet in a given set have similar conformation so that they can all engage the track flanges in the same way. Of course, being beneath the track flanges these feet 42 also resist loads pulling out of the track. The distance they travel forward freely before being wedged to a halt by entering anti-rattle engagement with the track flanges depends on the dimensions of the track flanges. An adjustment mechanism for dealing with this is discussed later.

The rear feet 5 are seen enlarged in FIGS. 8 and 9. Like the middle feet 42, the rear foot projections 52 have slightly laterally down-sloping top surfaces 53. This assists smooth movement beneath the rack flanges. Unlike the middle feet 42 their top surfaces 53 are longitudinally horizontal, i.e. generally parallel to the longitudinal axis. Thus, when they move forward in unison with the middle feet 42 they do not make a wedging anti-rattle contact. They slide freely beneath the track flange. They may be simple, fully sliding feet. However the illustrated embodiment uses a special form in which, at the rear end of each foot projection 52, a forwardly-facing laterally-projecting integral abutment shoulder 54 occupies the intermediate height region above the foot top surface level. As disclosed in our above-mentioned EP-A-2206623 these abutment shoulders are arcuately convex so as to meet complementarily the shoulders of the cut-outs 94 of the track. They lie within the circular plan outline of the feet 52 so that they can be lowered into the track together with the slidable feet. However they limit the forward slide of the feet when they meet the corresponding track cut-out shoulders. The abutments 54 provide extra strength against longitudinal displacement, sharing longitudinal load among numerous track cut-out surfaces (in combination with the non-slidable protrusion 3 at the front).

At the rear end of the device a free roller or wheel 11 is provided to roll in the track channel and help move the device freely as it is moved to the desired position on the track.

The rear end of the device carries an actuating lever 2 with drive (or actuating) and release mechanisms for operating the middle and rear slidable foot units 4, 5 and these mechanisms are now described.

The lever 2 pivots around a main transverse axis 99 at the rear end of the body 12, between a rearwardly-inclined release position (FIG. 1) and an upright actuated position (FIG. 2). It has a shaped casing 21 which houses and covers various elements of an actuating mechanism 6 and a release mechanism 7. The casing 12 has an upright shaft portion 211 formed as a hand grip, with finger-grip recesses defined around its front surface between forwardly-projecting guard ridges 26, 27*a*, 27*b*. An actuating button 72 for the release mechanism is recessed in the lower of the finger-grip recesses, so that the adjacent guard ridges protect it against accidental release by casual impacts. In use this part of the device will generally be rather inaccessible, under the rear part of a seat.

The bottom front part of the casing 21 has a forwardly-projecting limit stop projection 23, whose engagement with the top surface of the body 1 defines the actuated position, and side plates 24 which extend down the side faces of the rear end of the body 1, guiding the swing of the lever 2, supporting it against lateral forces and covering side guide slots 15 in the casing (described below).

The casing 2 houses an actuating mechanism 6. See FIGS. 4 to 9. The main mechanism comprises a rear leg 61 having a bottom pivotal attachment 29 at the rear end of the body 12 (for simplicity, the same as the wheel axis) to define the pivot axis of the lever 2. The rear leg 61 extends up with a slight forward tilt to the top of the lever 2 where it is connected, at a top pivot 621, to the top of a front leg 62. The front leg 62 extends down to the bottom of the lever 2 and into a top opening of the body casing 12 where it is connected to a rear pivot 641 of drive link 64. The drive link is a short rigid member, substantially horizontal in the actuated position shown, with front pivot connectors 642 which project out to be guided in horizontal tracks or slots 15 in the side walls of the body casing 12. A pivot pin 6421 connects this front pivot of the drive link 64 to the rear end 48 of the drive rod connector/slider carriage assembly, at a position above the rear slider (FIGS. 8 and 9).

For stability, the present embodiment duplicates the rear and front leg 61, 62 at either side of the handle 2, with elements of a release mechanism 7 sandwiched between them.

The release mechanism is shown especially in FIGS. 4 to 7. It comprises a main upright operating member 71 pivoted at the same top pivot 621 as the legs, and carrying integrally the trigger button 72 which is accessible at the front of the casing 211. The bottom end of the release operating member 71 has a downward stop face 74 which, in the locked condition (FIGS. 5, 6), rests stably on a top square rear surface of the drive link 64 so that it cannot rise. The operating member 71 is urged to this forward, locked position by a biasing spring 76 engaged in a seat 761 at the back of the casing 211, working on a spring guide projection 765 on the back of the operating member 71.

The top pivot 621 of the legs is fully constrained at the top of the lever casing 211 by internal formations 228 of the casing. Rearward pivoting of the lever requires rearward pivoting of the rear leg 621, rearward arcuate movement of the top pivot 621 taking the front leg 62 up and back with it, and consequent lifting of the rear pivot 641 of the drive link 64. However the stop face 74 on the release trigger operating member 71 prevents such lifting so the lever 2 is locked in the actuated position.

Pressing the release trigger button 72 to the position of FIG. 7 moves the release operating member 71 back in the handle. Its stop face 74 slides clear of the top rear corner of the drive link 64 so that the drive link rear can lift, following the lever swing backwards to the position of FIG. 1. The drive link rear pivot 641 moves back and up. Its front pivot 642 moves back in a straight longitudinal path, constrained by the guide slots 15. The drive rod connections 45, 48 and their associated foot sliders and foot formations 4, 5 are all moved linearly rearwardly. The distance of movement is about half a pitch spacing.

Pushing the lever 2 back to the upright position pushes the drive connectors 48, 45 and middle and rear sets of feet 4, 5 forward relative to the body 12. This is the actuating or locking motion. The release trigger operating member 71 has a length such that when, urged by its spring 76, it rides on concave cam surface 75 over the rear edge of the drive link 64 and brings its stop face 74 into engagement with the drive link, the drive link is slightly over-centre. That is to say, its rear pivot 641 lies slightly below the longitudinal drive line. It is therefore initially stable in the actuated position even after initial release of the release mechanism (FIG. 7), and release of the mechanism requires an additional rearward pull on the actuating handle to bring the link 64 back out of the over-centre condition. This is significant because a return spring 17 (FIG. 3), acting in compression between the front of the middle slider 41 and a body insert in front of it, continually biases the rear and middle track-engaging formations with their sliders and connecting rod to the rearward (disengaged) position corresponding to FIG. 1. After a user initially pulls the lever 2 backwards the movement is completed by the return spring 17. However the over-centre feature of the link 64 prevents release of the mechanism by mere pressing of the trigger button 72.

At the middle set 4 of anti-rattle feet 42 the degree of longitudinal movement to achieve optimum anti-rattle clamping varies slightly according to the dimensions of the track flanges. This may also apply with other kinds of cam-operated anti-rattle features operated by the longitudinal drive, e.g. using cam engagements inside the body rather between the feet and track flanges. An adjustment mechanism is provided for fine adjustment of the stroke or travel of the drive, or of its advanced position corresponding to the limit forward position of the actuating lever 2. This is achieved by adjusting the angle between the rear and front legs 62, 61. See FIGS. 8 and 9. Front and rear cross-pieces 615, 625 connect respectively between the pair of front legs 62 and the pair of rear legs 61. [The release operating member 71 has a clearance slot 73 for the front cross-piece 615]. An adjustment screw 63 engages threadedly through these cross-pieces and has its drivable head exposed at recess 27 at the front of the handle 2. FIG. 8 shows the screw 63 adjusted for minimum advance or travel of the sliders 41, 51, FIG. 9 shows it for maximum advance. In each case the lever 2 reaches the same stop orientation relative to the body, the front legs 62 always having the same orientation within the handle 2 so that the over-centre feature is retained. Only the orientation of the rear legs 61 relative to the handle casing 21 changes.

Figure 10:
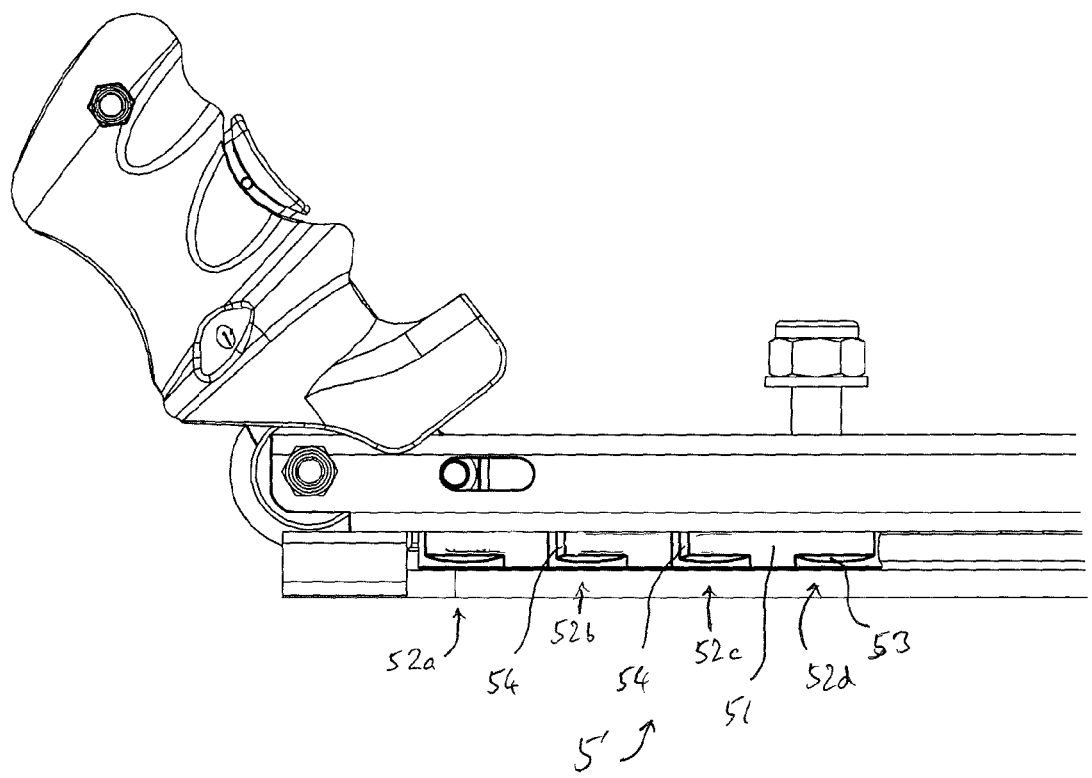
FIG. 10 shows a variant construction for the rear feet, in the same position as FIG. 1.

FIG. 10 shows a variant construction of the rear feet 5' with increased strength against pull-out. Four feet 52a,b,c,d are provided, i.e. one more than described above. This itself increases the pull-out strength. Also, only the middle two feet 52b,c have the intermediate-height abutment shoulders 54. The front and rear feet 52a,d of the set are simple feet without abutment shoulders, so that they would be freely slidable along the track were it not for the abutment shoulders 54 on the other feet of the set. This reduces the general width of the downward opening provided in the bottom of the tubular body casing 12 to accommodate the set of feet. The abutment shoulders 54 are wider than the narrow central keel of the slider body 51. In turn this strengthens the device against failure by pulling this opening apart.

Figure 5:
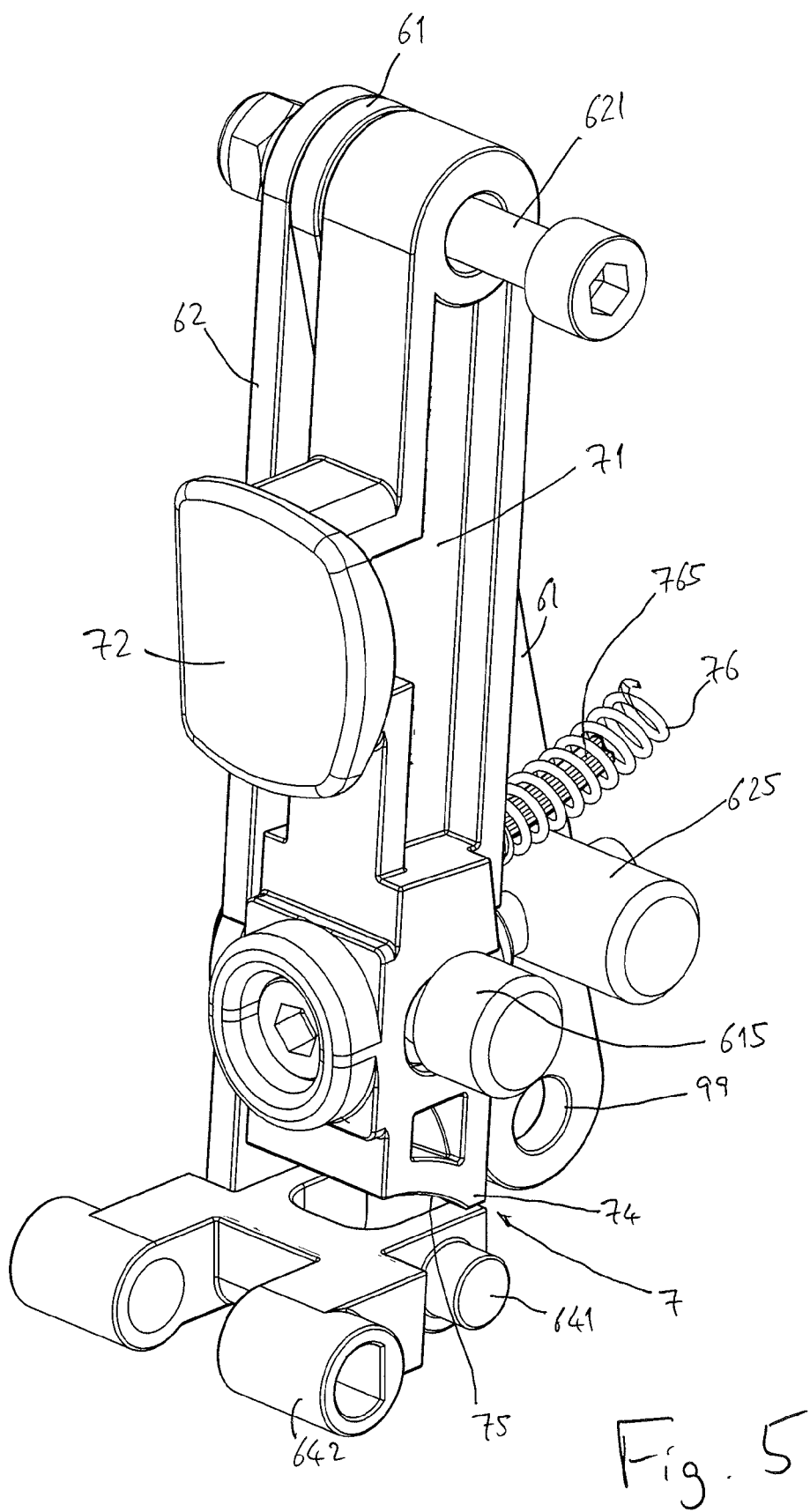
FIG. 5 is a similar view but with the entire lever casing and the left-side pair of pivoted legs removed to show more of the mechanism.

FIG. 11 shows a variant with refinements of the release mechanism: compare FIG. 5. The main elements of the mechanism are substantially the same as before. In FIG. 5 the downward stop face 74 is flat and rests (in the locked condition) stably on the flat top face at the rear of the drive link 64. In this variant the top surface at the rear of the drive link 64 has a locating groove 645, and a convex nib or rib 741 on the downward stop face of the release operating member 71 sits down in this groove 645 in the locked position. This greatly increases the force required to displace the release operating member 71 unintendedly out of engagement with the drive link 64, i.e. when the trigger button 72 is not being pressed, perhaps when the system is subject to violent load or shaking. The components are however still easily released by pressing on the trigger button 72 when unloaded. The groove and nib could be reversed.

The devices described can be adjusted to achieve optimal anti-rattle clamping with a given track. Usually the adjustment of anti-rattle takes priority over adjustment for the position of the abutment shoulders 54 of the rear feet, because the latter are still effective for emergency longitudinal load-bearing even if not initially in contact with the track cut-out faces.

The described actuating mechanism provides for convenient, low-profile operation, with simple movement of a single element at the most accessible part (rear end) of the device. Operation may be one-handed but still incorporates security against accidental release. The advancing action of the actuating mechanism is new in itself, and in an independent aspect can be used with other arrangements of track-locating formations, with or without anti-rattle or with the handle at a different position on an anchorage device body. The use of remote actuation to provide anti-rattle operation at a position remote from the actuator element is also distinctive. It will be understood that the anti-rattle mechanism may be of various kinds, or provided for more than one set of track-engaging formations, or at a different position on the device body. It is not critical that the track-engaging formations are in spaced sets. Any or all sets may have only one engaging formation may be used. Anti-rattle may use sideways moving (expanding) formations instead of lifting formations. Equally it will be understood that the construction can readily be adapted to be built into a bottom support element or frame of a seat or other functional article.

The invention claimed is:

1. Anchorage device, for use in anchoring objects to a track having a top channel opening defined between opposed overhanging channel lips, the anchorage device comprising:
    an elongate body having a front end, a rear end, an intermediate portion and an underside;
    plural track-engaging formations attached relative to and distributed along the underside of the body, for insertion into the channel opening of the track in use, said track-engaging formations including longitudinally-slidable protrusions and one or more non-slidable protrusions and operable to provide a secured condition in which the longitudinally-slidable protrusions are captive beneath the track lips and the anchorage device is held against being pulled out of the track, one or more of said track-engaging formations being movable, in an actuating operation of the device, relative to one or more other said track-engaging formations and/or relative to the elongate body; and
    an actuating mechanism for driving a said relative movement of one or more of said relatively movable track-engaging formations and an actuating member for driving the actuating mechanism, said actuating member being provided at the rear end of the body,
    the actuating mechanism comprising an elongate drive element extending longitudinally of the body and having a longitudinal axis, operatively connected at a proximal end thereof to the actuating member, and operatively connected at a distal part thereof to a said relatively movable track-engaging formation spaced along the body at a position longitudinally remote from said actuating member, whereby in said actuating operation, movement of the actuating member displaces the elongate drive element longitudinally to operate a said relative movement of said remote track-engaging formation in which one or more said longitudinally-slidable protrusions is driven longitudinally relative to one or more said non-slidable protrusions.

2. Anchorage device according to claim 1 in which the actuating member is a lever pivotally mounted at the rear end of the body.

3. Anchorage device according to claim 2 in which the actuating member is a lever movable in an upright longitudinal plane.

4. Anchorage device according to claim 1 in which the elongate drive element comprises a rigid longitudinal rod.

5. Anchorage device according to claim 1 comprising an anti-rattle mechanism for said remote track-engaging formation operated by the distal part of the drive element, the anti-rattle mechanism being operable by longitudinal movement of said elongate drive element to cause said track-engaging formation to move vertically or laterally relative to an adjacent point on the device body, to tighten the track-engaging formation against the track in use.

6. Anchorage device according to claim 1 in which a said remote track-engaging formation operated by the distal part of the drive element is at least mid-way along the body of the device from the rear end.

7. Anchorage device according to claim 1 in which said actuating mechanism comprises an actuator drive portion of said actuating member and a guided drive link connecting between the longitudinal drive element and said actuator drive portion, wherein the guided drive link moves with a non-longitudinal component of movement when the actuating member is operated.

8. Anchorage device according to claim 7 in which the drive link has a rear end connected pivotally to the actuator drive portion and a front end connected pivotally to the elongate drive element.

9. Anchorage device according to claim 8 in which the rear end of the drive link moves in an arc when the actuating member is operated.

10. Anchorage device according to claim 8 in which the front end of the drive link engages a guide track of the device body to maintain longitudinal alignment of the drive element as the drive link moves.

11. Anchorage device according to claim 8 in which, at the end of an actuating movement of the actuating member, the rear end of the drive link crosses the longitudinal axis of the elongate drive element to an over-center condition whereby the actuation is not reversible by reverse force along the drive element.

12. Anchorage device according to claim 1 comprising a release mechanism operable to release the actuating mechanism and thereby free the anchorage device from said secured condition.

13. Anchorage device according to claim 12 in which said release mechanism is incorporated in said actuating member and comprises a release trigger on the actuating member.

14. Anchorage device according to claim 1 for use in anchoring objects to a said track in which said top channel opening has a series of periodic cut-outs in the lips thereof, said track-engaging formations of the device including a fixed downward protrusion at the front end of the body, as a said non-slidable protrusion, for insertion into a said cut-out to fix the longitudinal position of the anchorage device before operation of the actuating mechanism to provide said secured condition in which the track-engaging formations are captive beneath the track lips.

15. Anchorage device according to claim 1 in which said track-engaging formations are provided as a rear set of track-engaging formations at the rear end, a middle set of track-engaging formations at the intermediate portion and one or more track-engaging formations at the front end, the device comprising an anti-rattle mechanism for said middle set of track-engaging formations operated by the distal part of the elongate drive element.

16. Anchorage device according to claim 15 in which said rear set, middle set and front track-engaging formations are longitudinally spaced from one another.

17. Anchorage device according to claim 15 in which both the rear set and middle set of track-engaging formations are longitudinally-slidable relative to the body by the actuating mechanism and one or more track-engaging formations at the front end.

18. Vehicle seat system comprising one or more anchorage devices according to claim 1.

19. Anchorage device, for use in anchoring objects to a track having a top channel opening defined between opposed overhanging channel lips, the anchorage device comprising:
an elongate body having a front end, a rear end, an intermediate portion and an underside;
plural track-engaging formations attached relative to and distributed along the underside of the body, for insertion into the channel opening of the track in use and operable to provide a secured condition in which the track-engaging formations are captive beneath the track lips and the anchorage device is held against being pulled out of the track, one or more of said track-engaging formations being movable, in an actuating operation of the device, relative to one or more other said track-engaging formations and/or relative to the elongate body; and
an actuating mechanism for driving a said relative movement of one or more of said relatively movable track-engaging formations and an actuating member for driving the actuating mechanism, said actuating member being provided at the rear end of the body,
the actuating mechanism comprising an elongate drive element extending longitudinally of the body, operatively connected at a proximal end thereof to the actuating member, and operatively connected at a distal part thereof to a said relatively movable track-engaging formation spaced along the body at a position longitudinally remote from said actuating member, whereby in said actuating operation, movement of the actuating member displaces the elongate drive element longitudinally to operate the relative movement of said remote track-engaging formation,
wherein said actuating mechanism comprises an actuator drive portion of said actuating member and a guided drive link connecting between the longitudinal drive element and said actuator drive portion, the drive link has a rear end connected pivotally to the actuator drive portion and a front end connected to the elongate drive element, wherein the guided drive link moves with a non-longitudinal component of movement when the actuating member is operated, the device body has a guide track and the front end of the drive link engages the guide track to maintain longitudinal alignment of the drive element with the device body as the drive link moves.

20. Anchorage device, for use in anchoring objects to a track having a top channel opening defined between opposed overhanging channel lips, the anchorage device comprising:
an elongate body having a front end, a rear end, an intermediate portion and an underside;
plural track-engaging formations attached relative to and distributed along the underside of the body, for insertion into the channel opening of the track in use and operable to provide a secured condition in which the track-engaging formations are captive beneath the track lips and the anchorage device is held against being pulled out of the track, one or more of said track-engaging formations being movable, in an actuating operation of the device, relative to one or more other said track-engaging formations and/or relative to the elongate body; and an actuating mechanism for driving a said relative movement of one or more of said relatively movable track-engaging formations and an actuating member for driving the actuating mechanism, said actuating member being provided at the rear end of the body, the actuating mechanism comprising an elongate drive element extending longitudinally of the body, operatively connected at a proximal end thereof to the actuating member, and operatively connected at a distal part thereof to a said relatively movable track-engaging formation spaced along the body at a position longitudinally remote from said actuating member, whereby in said actuating operation, movement of the actuating member displaces the elongate drive element longitudinally to operate the relative movement of said remote track-engaging formation, wherein said track-engaging formations are provided as a rear set of track-engaging formations at the rear end, a middle set of track-engaging formations at the intermediate portion and one or more fixed, non-slidable protrusions at the front end, the rear set of track-engaging formations and the middle set of track-engaging formations being longitudinally spaced from one another and from the front track-engaging formations, the device comprising an anti-rattle mechanism only for said middle set of track-engaging formations, the anti-rattle mechanism being operated by the distal part of the elongate drive element.

21. Anchorage device, for use in anchoring objects to a track having a top channel opening defined between opposed overhanging channel lips, the anchorage device comprising:

an elongate body having a front end, a rear end, an intermediate portion and an underside;

plural track-engaging formations attached relative to and distributed along the underside of the body, for insertion into the channel opening of the track in use and operable to provide a secured condition in which the track-engaging formations are captive beneath the track lips and the anchorage device is held against being pulled out of the track, one or more of said track-engaging formations being movable, in an actuating operation of the device, relative to one or more other said track-engaging formations and/or relative to the elongate body; and an actuating mechanism for driving a said relative movement of one or more of said relatively movable track-engaging formations and an actuating member for driving the actuating mechanism, said actuating member being provided at the rear end of the body, the actuating mechanism comprising an elongate drive element extending longitudinally of the body, operatively connected at a proximal end thereof to the actuating member, and operatively connected at a distal part thereof to a said relatively movable track-engaging formation spaced along the body at a position longitudinally remote from said actuating member, whereby in said actuating operation, movement of the actuating member displaces the elongate drive element longitudinally to operate the relative movement of said remote track-engaging formation, and the actuating mechanism comprising an adjustment mechanism for changing a predetermined stroke or degree of advancement of the drive element in said actuating operation, wherein the actuating member comprises a drive portion by which the actuating member is connected to the actuating mechanism, and the drive portion is positionally adjustable relative to the rest of the actuating member by an adjustment screw.

22. Anchorage device, for use in anchoring objects to a track having a top channel opening defined between opposed overhanging channel lips, the anchorage device comprising:

an elongate body having a front end, a rear end, an intermediate portion and an underside;

plural track-engaging formations attached relative to and distributed along the underside of the body, for insertion into the channel opening of the track in use and operable to provide a secured condition in which the track-engaging formations are captive beneath the track lips and the anchorage device is held against being pulled out of the track, one or more of said track-engaging formations being movable, in an actuating operation of the device, relative to one or more other said track-engaging formations and/or relative to the elongate body; and an actuating mechanism for driving a said relative movement of one or more of said relatively movable track-engaging formations and an actuating member for driving the actuating mechanism, said actuating member being provided at the rear end of the body, the actuating mechanism comprising an elongate drive element extending longitudinally of the body, operatively connected at a proximal end thereof to the actuating member, and operatively connected at a distal part thereof to a said relatively movable track-engaging formation spaced along the body at a position longitudinally remote from said actuating member, whereby in said actuating operation, movement of the actuating member displaces the elongate drive element longitudinally to operate the relative movement of said remote track-engaging formation, wherein the actuating member is an actuator lever having a free top end and includes a front leg and a rear leg pivoted together at top ends thereof, the bottom end of the rear leg being pivoted to the device body to provide the lever pivot, and the actuating mechanism comprising a drive link having a front end which connects to the elongate drive element and a rear end which is pivoted to the bottom end of the front leg.

23. Anchorage device according to claim 22 in which the angle between the front and rear legs is adjustable by an adjustment screw.

* * * * *